United States Patent [19]

Yokokura et al.

[11] 4,381,886
[45] May 3, 1983

[54] LIQUID CRYSTAL DISPLAY ELEMENT

[75] Inventors: Hisao Yokokura, Hitachi; Teruo Kitamura, Katsuta; Ren Ito, Hitachi; Fumio Nakano, Hitachi; Hirosada Morishita, Hitachi; Mikio Sato, Hitachi; Yasuhiko Kando, Mobara, all of Japan

[73] Assignee: Hitachi, Ltd., Tokyo, Japan

[21] Appl. No.: 234,261

[22] Filed: Feb. 13, 1981

[30] Foreign Application Priority Data

Feb. 15, 1980 [JP] Japan .................................. 55-16654

[51] Int. Cl.³ .............................................. G02F 1/13
[52] U.S. Cl. .................................. 350/341; 350/340; 428/1; 252/299.4
[58] Field of Search ............................. 350/340, 341; 252/299.3, 299.4, 299.63; 428/1; 430/20

[56] References Cited

U.S. PATENT DOCUMENTS 3,994,567 11/1977 Matsumoto ..................... 350/341

FOREIGN PATENT DOCUMENTS

| | | | |
|---|---|---|---|
| 53-128350 | 11/1978 | Japan | 252/299.01 |
| 54-49155 | 4/1979 | Japan | 252/299.4 |
| 54-101339 | 8/1979 | Japan | 252/299.2 |
| 54-119941 | 9/1979 | Japan | 252/299.4 |
| 54-128357 | 10/1979 | Japan | 350/341 |
| 54-133358 | 10/1979 | Japan | 252/299.4 |
| 54-133359 | 10/1979 | Japan | 350/341 |
| 54-133360 | 10/1979 | Japan | 252/299.2 |
| 54-133361 | 10/1979 | Japan | 350/341 |
| 54-128357 | 10/1979 | Japan | 350/341 |

*Primary Examiner*—John K. Corbin
*Assistant Examiner*—David Lewis
*Attorney, Agent, or Firm*—Antonelli, Terry & Wands

[57] ABSTRACT

A liquid crystal display element which may have a multi-layer structure comprising substrates having electrodes and liquid crystal orientation controlling films on the sides thereof facing a liquid crystal layer and one or more liquid crystal layers interposed between said substrates, characterized in that the liquid crystal orientation controlling film is made from a copolymer produced by reacting a dibasic acid dihydrazide, a diamine and a tetracarboxylic acid dianhydride, followed by ring closure and dehydration with heating, is excellent in transparency and the electrode (partially reflected) pattern is hardly observable.

21 Claims, 1 Drawing Figure

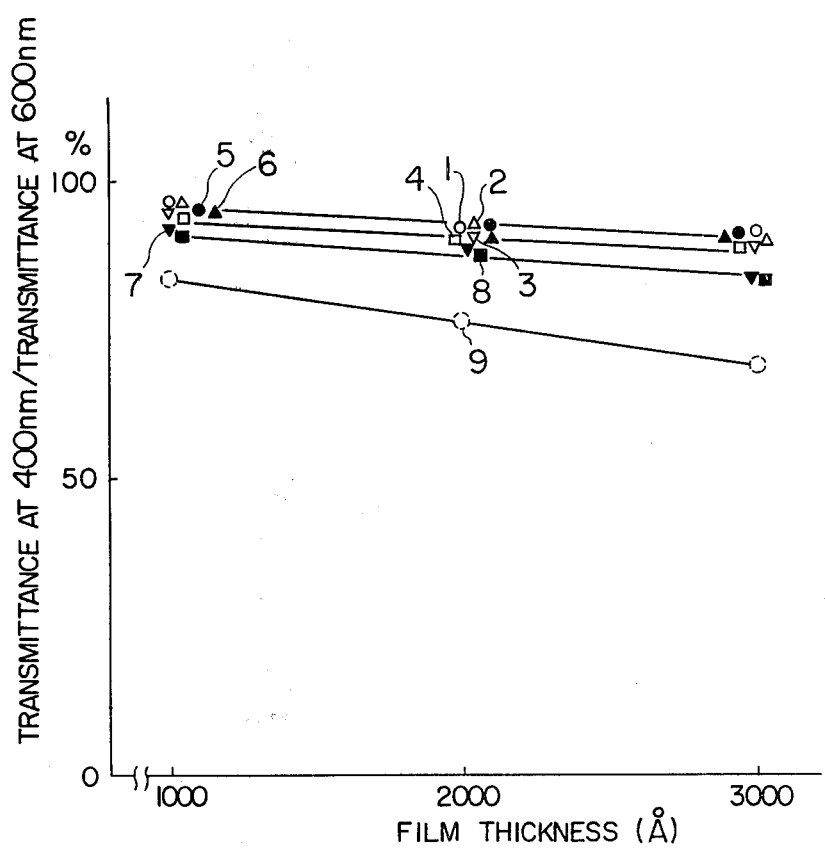

LIQUID CRYSTAL DISPLAY ELEMENT

BACKGROUND OF THE INVENTION

This invention relates to a liquid crystal display element, more particularly to a liquid crystal display element having liquid crystal orientation controlling film made from a special polyhydrazimideimide.

Heretofore, as the liquid crystal orientation controlling film used in nematic liquid crystal display elements applying electro-optical effect operated particularly by the action of electric field, there have mainly been used inorganic material films such as silicon monooxide film produced by an oblique vacuum vaporization method or the like. This is because the inorganic films have no factor giving bad influence on liquid crystals used together since they do not dissolve the liquid crystals when contacted and have an advantage in that they can orientate Schiff base type liquid crystals and biphenyl type liquid crystals uniformly. The silicon monooxide oblique vacuum vaporized film is excellent in transparency, but has a defect in that patterns formed by transparent electrodes made of metal oxide film (hereinafter referred to as "partially reflected pattern") are easily observable when such patterns should not be observable.

On the other hand, there have been developed liquid crystal display elements using as the liquid crystal orientation controlling film a film made from organic polymer materials and orientation treated by rubbing in one direction by means of a cloth or the like. But when organic polymer materials are used as the liquid crystal orientation controlling film (or simply "the orientation film") there are many defects in that almost organic polymer materials can hardly produce uniformity in liquid crystal orientation, non-uniformity in the orientation is easily increased by deterioration caused by passing an electric current for a long period of time, and the like.

Among organic polymer materials, some polyimides are known as forming orientation films having relatively excellent orientation properties. For example, U.S. Pat. No. 3,994,567 discloses polyimides such as produced by reacting 4,4'-diaminodiphenyl ether with pyromellitic dianhydride, said polyimides being considerably good in uniformity in orientation and in durability by a weathering test. But there are many problems in using such polyimide films, since browning of such polyimides remarkably proceeds by heating at the time of removal of the solvent and ring closure by dehydration, which results in producing browning in a liquid crystal display element after placing a liquid crystal material therein, making the visual field dark at the same time, also lowering contrast and not satisfying the requirements for performance as display element, particularly for display of high quality. On the other hand, when polyimide-isoindoloquinazolinedione is used as the polyimide according to U.S. patent application Ser. No. 1161, filed Jan. 5, 1979, now abandoned, the sealing by using frit glass at 450° C. becomes possible and the reliability (poor in blotting) is improved but the orientation film is undesirably colored.

Recent increasing demand for liquid crystal cells having a multilayer structure wherein two or more liquid crystal layers are laminated by interposing transparent substrates requires polyimide orientation films which do not show such coloring as mentioned above.

SUMMARY OF THE INVENTION

It is an object of this invention to provide a liquid crystal display element having liquid crystal orientation controlling film which is not colored by heating at removal of a solvent and ring closure by dehydration, is excellent in transparency, and hardly shows the partially reflected pattern.

This invention provide a liquid crystal display element comprising substrates having electrodes and liquid crystal orientation controlling films on the sides thereof facing a liquid crystal layer and one or more liquid crystal layers interposed between said substrates, characterized in that the liquid crystal orientation controlling film is made from a copolymer having structural units of the formulae:

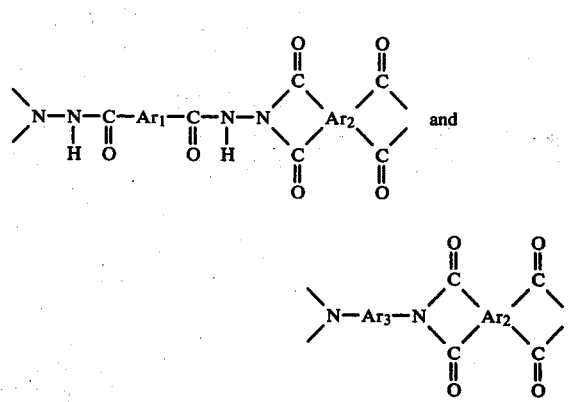

wherein $Ar_1$ is a dihydrazide residue; $Ar_2$ is a tetracarboxylic acid residue; and $Ar_3$ is a diamine residue.

BRIEF DESCRIPTION OF THE DRAWING

The attached drawing is a graph showing the relationship between spectral transmittance and film thickness.

DETAILED DESCRIPTION OF THE INVENTION

The present inventors have studied how to lowering the coloring and improving transparency, these being defects of conventional polyimide films, and found that a main cause for coloring the conventional polyimide films is in the starting materials used for synthesizing the polyimides, particularly in diamine compounds and that such a cause can be removed by using a dibasic acid hydrazide mainly together with diamines and the like, and accomplished this invention.

Since the liquid crystal orientation controlling film used in this invention has high transparency with no coloring, it can be applied to liquid crystal display elements having a multiplayer structure.

The copolymer having structural units of the formulae as mentioned above (polyhydrazimide-imide) can be produced by ring closure accompanying dehydration with heating preferably at 150° to 300° C. of a polyhydrazide acid-amide acid having structural units of the formulae:

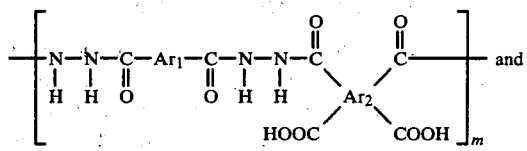 and wherein $Ar_2$ is a tetracarboxylic acid residue; and a diamine of the formula:

$$H_2N-Ar_3-NH_2 \quad (III)$$

wherein $Ar_3$ is a diamine residue.

These reactions can be shown schematically as follows:

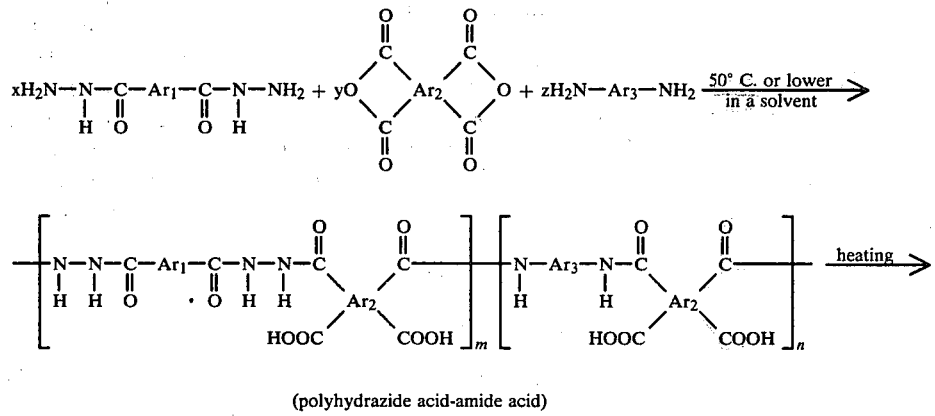

(polyhydrazide acid-amide acid)

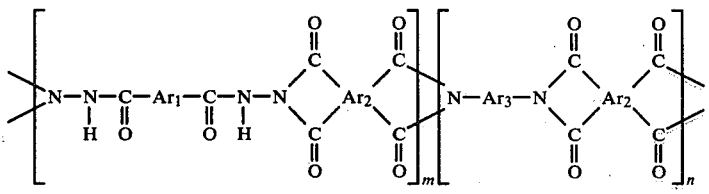

(polyhydrazimide-imide)

note
m and n of the polyhydrazide acid-amide acid are values which can give a reduced viscosity ($\eta_{sp/c}$) of 0.1 dl/g or more (measured by the method mentioned above).

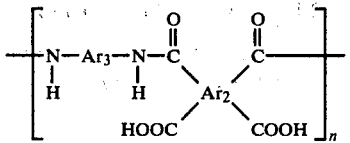

wherein $Ar_1$, $Ar_2$ and $Ar_3$ are as defined above; and values m and n are those which can give a reduced viscosity ($\eta_{sp/c}$) of 0.1 dl/g or more measured by using dimethyl sulfoxide as a solvent in a concentration of 0.1 g/l at 30° C.

The polyhydrazide acid-amide acid is produced by reacting a dihydrazide of the formula:

 (I)

wherein $Ar_1$ is a dihydrazide residue, a tetracarboxylic acid dianhydride of the formula:

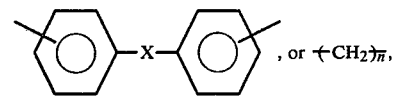 (II)

In the dihydrazide of the formula (I), the dihydrazide residue of $Ar_1$ means

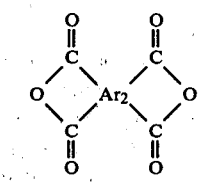

in which X is —O—, —CH$_2$—, —SO$_2$—, —CO— or —S—; and n is an integer of 1 to 8.

Examples of the dihydrazides of the formula (I) are isophthalic acid dihydrazide, terephthalic acid dihydrazide, 4,4'-oxy-bis(benzoic acid hydrazide), 4,4'-sulfonyl-bis(benzoic acid hydrazide), 3,3'-sulfonyl-bis(benzoic acid hydrazide), 4,4'-methylene-bis(benzoic acid hydrazide), 4,4'-carbonyl-bis(benzoic acid hydrazide), 4,4'-biphenyl-di(carbonyl hydrazide), oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, and the like.

In the tetracarboxylic acid dianhydride of the formula (II), the tetracarboxylic acid residue $Ar_2$ means

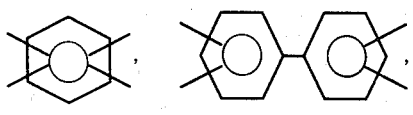 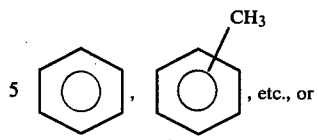

in which X is —O—, —SO$_2$—, —CO—,

or —CH$_2$—.

Examples of the tetracarboxylic acid dianhydrides of the formula (II) are pyromellitic dianhydride, 3,3',4,4'-biphenyltetracarboxylic dianhydride, 3,3',4,4'-benzophenonetetracarboxylic dianhydride, cyclopentanetetracarboxylic dianhydride, 1,2,5,6-naphthalenetetracarboxylic dianhydride, 2,3,6,7-naphthalenetetracarboxylic dianhydride, 1,4,5,8-naphthalenetetracarboxylic dianhydride, 3,4,9,10-perylenetetracarboxylic dianhydride, 2,3,5,6-pyridinetetracarboxylic dianhydride, 4,4'-sulfonyldi(phthalic anhydride), 4,4'-oxydi(phthalic anhydride), 4,4'-carbonyldi(phthalic anhydride), 4,4'-isopropylidenedi(phthalic anhydride), and the like.

In the diamine of the formula (III), the diamine residue Ar$_3$ means

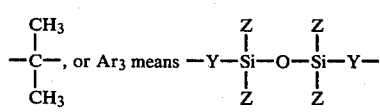

in which X is —O—, —CH$_2$—, —SO$_2$—, —CO—, —S— or

in which Y is an alkylene group having 1 to 5 carbon atoms, an alkyl group having 1 to 5 carbon atoms, a phenylene group; and Z is an alkyl group having 1 to 3 carbon atoms, an aryl group such as

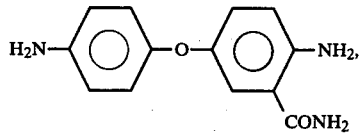

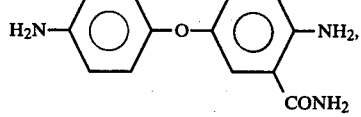

Examples of the diamines of the formula (III) are m-phenylenediamine, p-phenylenediamine, benzidine, 4,4'-diaminoterphenyl, 4,4'-oxydianiline, 3,4'-oxydianiline, 4,4'methylenedianiline, 4,4'sulfonyldianiline, 3,3'-sulfonyldianiline, 3,3'-carbonyldianiline, 4,4'-thiodianiline, bis[4-(p-aminophenoxy)phenyl] ether, bis[4-(p-aminophenoxy)phenyl]methane, bis[4-aminophenoxy)phenyl] sulfone, bis[4-(p-aminophenoxy)phenyl] sulfone, 4,4'-bis(p-aminophenoxy)benzophenone, bis[4-(p-aminophenoxy)phenyl] sulfide, bis[4-(p-aminophenoxy)phenyl]propane, 4,4'-diamino-3-carbamoyldiphenyl ether of the formula:

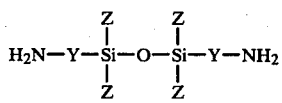

diaminosiloxanes of the formula:

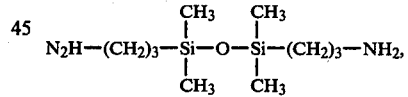

for example,

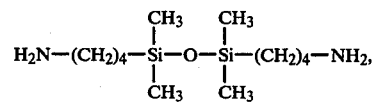

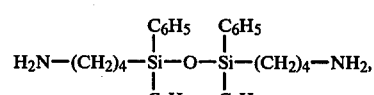

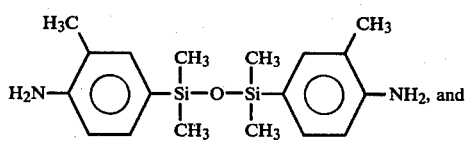

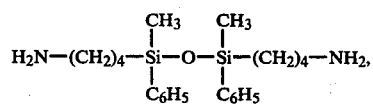

and other diaminosiloxanes such as

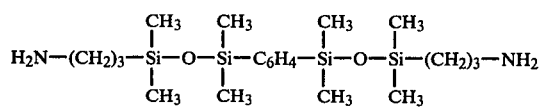

These starting reactants can be used alone or as a mixture thereof.

It is preferable to use the dihydrazide of the formula (I) and the diamine of the formula (III), these being basic components, in a molar ratio of 95:5 to 50:50. It is usual to use about equimolar amounts of the tetracarboxylic acid dianhydride of the formula (II) and the above-mentioned basic components of the formulae (I) and (III).

When the molar ratio of the tetracarboxylic acid dianhydride to the basic components becomes far from 1/1, the degree of polymerization decreases and film forming properties and properties of formed film are lowered. When the molar ratio of the dihydrazide/diamine is larger than 95/5, that is the dihydrazide is larger than 95 and the diamine is smaller than 5 in the molar ratio, the polymer readily precipitates from a varnish and the resulting film is poor in heat resistance and has a tendency to show the partially reflected pattern. On the other hand, when the molar ratio of the dihydrazide/diamine is smaller than 50/50, that is the dihydrazide is smaller than 50 and the diamine is larger than 50 in the molar ratio, coloration of the resulting copolymer becomes outstanding. Therefore, taking stability of the varnish, heat resistance and transparency into consideration, it is preferable to use the starting reactants in the ranges mentioned above.

In this invention, the polyhydrazide acid-amide acid generally has a reduced viscosity ($n_{sp/c}$) in the range of 0.1 to 1.0 dl/g (solvent, dimethyl sulfoxide, a concentration 0.1 g/l, measuring temperature 30° C., using a Ubbelohde's viscometer).

The reaction of the dihydrazide of the formula (I), the diamine of the formula (III) and the tetracarboxylic acid dianhydride of the formula (II) is carried out in a solvent. Examples of the solvents are good solvents for the produced polymer such as N-methyl-2-pyrrolidone, N,N-dimethylformamide, N,N-diethylformamide, N,N-dimethylacetamide, hexamethylphosphoramide, dimethyl sulfoxide, sulfolane, and the like.

The reaction can preferably be carried out at a temperature of about 50° C. or lower, more preferably at room temperature or lower (e.g. about 10° C.) with stirring. With the progress of the reaction, the viscosity of the reaction solution increases gradually to finally give the polyhydrazide acid-amide acid solution (in the form of a varnish).

Since the resulting varnish is stable at about room temperature or lower, it can be stored for a long period of time and can be used as a starting composition for producing a polyhydrazimide-imide copolymer orientation film, in which the solid content is usually 15% by weight or less, more preferably 5 to 10% by weight.

The liquid crystal orientation controlling film can be prepared by coating the resulting varnish of polyhydrazide acid-amide acid on a substrate conventionally used such as transparent glass by a conventional method such as brushing, dripping, spin coating, printing or the like, and heating preferably at 150° to 300° C. for removing the solvent used and conducting the ring closure. In order to form an orientation controlling film having no pin hall on a substrate having electrodes by using an offset printing machine, it is more preferable to use a polyhydrazide acid-amide acid having a reduced viscosity ($\eta_{sp/c}$) in the range of 0.3 to 0.8 dl/g (30° C.).

The orientation controlling film can directly be formed on an electroconductive layer which has been formed on a substrate, but when an inorganic insulating layer is formed under or over the electroconductive layer and thereafter the orientation controlling film is formed thereon, liquid crystal display elements having more excellent performance can be produced. It is identified by experiments that when the orientation controlling film is formed on the inorganic insulating layer, not directly on the electroconductive layer formed on the glass substrate, thermal deterioration at the time of curing caused by, for example, sodium ions in soda glass can be prevented. Examples of inorganic insulating films showing such an effect are films of $SiO_2$, $Al_2O_3$, and $TiO_2$.

In order to obtain more tough orientation controlling films in this invention, it is preferable to use one or more epoxy series and/or amino series silane coupling agents together. Examples of the silane coupling agents are γ-aminopropyltriethoxysilane, γ-glycidoxypropyltrimethoxysilane, N-β(aminoethyl)-γ-aminopropylmethyldimethoxysilane, N-β(aminoethyl)-γ-aminopropyltrimethoxysilane, etc. These silane coupling agents can be added to the varnish of polyhydrazide acid-amide acid dropwise or a film of silane coupling agent can be formed on the electroconductive film, followed by the formation of the orientation controlling film.

The thus prepared substrates, each having an electroconductive layer, an inorganic insulating layer if desired, and an orientation controlling film thereon, are used for preparing liquid crystal display elements in a conventional manner.

As liquid crystal materials, those conventionally used in display elements can be used. Examples of liquid crystal materials are p-alkylbenzylidene-p'-cyanoanilines of the formula:

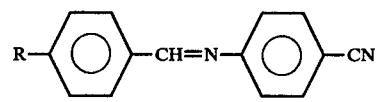

wherein R is alkyl; p-alkoxybenzylidene-p'-cyanoanilines of the formula:

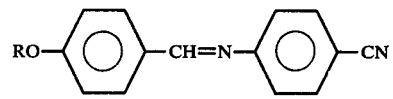

wherein RO is alkoxy; p-alkylbenzylidene-p'-alkoxyanilines of the formula

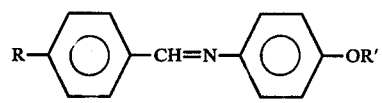

wherein R is alkyl and OR' is alkoxy; p-alkyl- or alkoxy-p'-cyanobiphenyls of the formula:

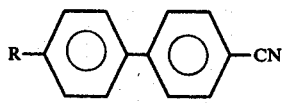

wherein R is alkyl or alkoxy; p-alkylphenyl- or alkoxyphenyl-p'-cyanobenzoates of the formula:

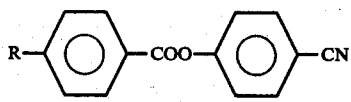

wherein R is alkyl or alkoxy; p-alkylphenyl-p'-alkoxybenzoates of the formula:

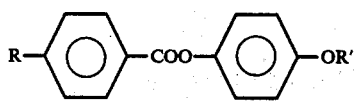

wherein R is alkyl and OR' is alkoxy; p-cyanophenyl-4'-alkyl- or alkoxycyclohexanes of the formula:

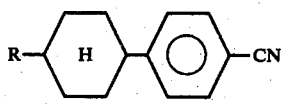

wherein R is alkyl or alkoxy; p-cyanophenyl-4'-alkyl- or alkoxycyclohexane carboxylates of the formula:

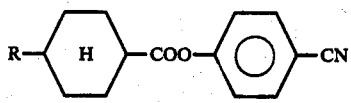

wherein R is alkyl or alkoxy; p-alkoxyphenyl-4'-alkyl-cyclohexane carboxylates of the formula:

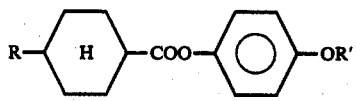

wherein R is alkyl and OR' is alkoxy; and the like liquid crystals.

This invention is illustrated by way of the following Examples.

EXAMPLE 1

In a flask, 0.095 mole of isophthalic acid dihydrazide, 0.005 mole of p-phenylenediamine, 0.1 mole of pyromellitic dianhydride and N-methyl-2-pyrrolidone were placed and reacted at 5° C. for 3 hours with stirring to give a polymer solution having a solid content of 12% by weight. The produced polyhydrazide acid-amide acid had a reduced viscosity ($\eta_{sp/c}$) of 0.5 dl/g measured by using as a solvent dimethyl sulfoxide in a concentration of 0.1 g/100 cc of the solution at 30° C. (the same method being used in the following Examples). The polymer solution was diluted to a solid content of 7% by weight by adding N-methyl-2-pyrrolidone. The diluted polymer solution was printed on substrates for liquid crystal cell having electrodes thereon by using an offset printing machine and heated at 250° C. for 1 hour for removing the solvent and conducting ring closure to give orientation controlling films having a thickness of 1000, 2000 and 3000 Å, respectively. The orientation controlling films were rubbed in one direction by means of a cotton cloth. A pair of the thus treated substrates having a total orientation controlling film thickness of 1000, 2000 and 3000 Å were placed in parallel in a usual manner by interposing a conventional spacer and sealed by using an epoxy resin sealer followed by puring a liquid crystal composition thereinto and epoxy resin sealing to give liquid crystal display elements. Three kinds of liquid crystal compositions were placed individually in each display element having different orientation controlling film thickness. The liquid crystal compositions used were as follows:

(1) Biphenyl type mixture

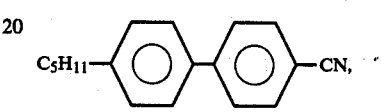

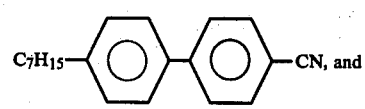

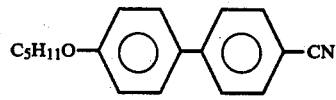

(2) Ester type mixture

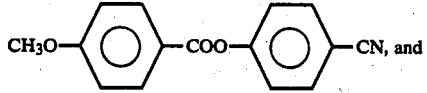

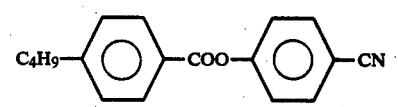

(3) Cyclohexane type mixture

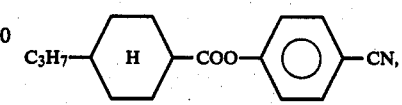

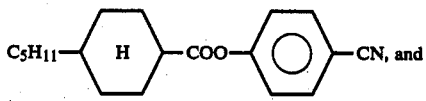

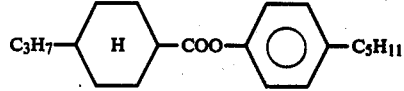

Transmittance of these display elements was measured by using a spectrometer. The results were shown in the attached drawing. Since there was no difference in transmittance between differences in the kinds of liquid crystal compositions (1) to (3), the results were shown by one point at each total orientation controlling film thickness of 1000, 2000 and 3000 Å with numeral 1. Further no partially reflected pattern was observed (◎) by the partially reflected pattern test.

The partially reflected pattern test was conducted as follows: the electrode patterns of a liquid crystal display element were observed by the naked eye at an angle of 30° and evaluated by the following three degrees: ◎ partially reflected patterns being not observed at all; ○ partially reflected patterns being observed slightly; and X partially reflected patterns being observed clearly.

EXAMPLE 2

To the same polymer solution as used in Example 1, γ-aminopropyltriethoxysilane in an amount of 0.1% by weight was added and orientation controlling films were prepared in the same manner as described in Example 1. Liquid crystal display elements were produced and tested in the same manner as described in Example 1. Transparency was as shown in the attached drawing with numeral 2. The partially reflected pattern test, ◎.

EXAMPLE 3

In a flask, 0.05 mole of isophthalic acid dihydrazide, 0.05 mole of 4,4'-diaminodiphenyl sulfone, 0.05 mole of pyromellitic dianhydride, 0.05 mole of 3,3',4,4'-benzophenonetetracarboxylic dianhydride and N-dimethylacetamide were placed and reacted at 10° C. for 5 hours with stirring to give a polymer solution having a reduced viscosity ($\eta_{sp/c}$) of 0.4 dl/g at 30° C. and a solid content of 14% by weight. The polymer solution was diluted to a solid content of 5% by weight. The diluted polymer solution was printed on substrates for liquid crystal cell having an inorganic insulating $SiO_2$ film of 1200 Å thick and transparent electrodes made of $In_2O_3$ as a main component thereon by using an offset printing machine. In the same manner as described in Example 1, orientation controlling films having thicknesses of 1000, 2000 and 3000 Å were produced. Liquid crystal display elements were produced and tested in the same manner as described in Example 1. Transparency was as shown in the attached drawing with numeral 3. The partially reflected pattern test, ◎.

EXAMPLE 4

To the same polymer solution as used in Example 3, γ-glycidoxypropyltrimethoxysilane in an amount of 0.15% by weight was added and orientation controlling films were prepared in the same manner as described in Example 3. Liquid crystal display elements were produced and tested in the same manner as described in Example 1. Transparency was as shown in the attached drawing with numeral 4. The partially reflected pattern test, ◎.

EXAMPLE 5

In a flask, 0.07 mole of isophthalic acid dihydrazide, 0.02 mole of terephthalic acid dihydrazide, 0.01 mole of 4,4'-bis(m-aminophenoxy)-diphenyl sulfone, 0.03 mole of 3,3',4,4'-benzophenonetetracarboxylic dianhydride and N,N-dimethylformamide were placed and reacted at 5° C. for 7 hours to give a polymer solution having a reduced viscosity ($\eta_{sp/c}$) of 0.4 dl/g at 30° C. and a solid content of 12% by weight. The polymer solution was diluted to a solid content of 10% by weight. Using the diluted polymer solution and an offset printing machine, orientation controlling films having thicknesses of 1000, 2000 and 3000 Å were produced in the same manner as described in Example 1 except for heating at 200° C. for 1 hour for removing the solvent and conducting ring closure. Liquid crystal display elements were produced and tested in the same manner as described in Example 1. Transparency was as shown in the attached drawing with numeral 5. The partially reflected pattern test, ◎.

EXAMPLE 6

To the same polymer solution as used in Example 5. γ-glycidoxypropyltrimethoxysilane in an amount of 0.05% by weight was added and orientation controlling films were prepared in the same manner as described in Example 5. Liquid crystal display elements were produced and tested in the same manner as described in Example 1. Transparency was as shown in the attached drawing with numeral 6. The partially reflected pattern test, ◎.

EXAMPLE 7

In a flask, 0.08 mole of isophthalic acid dihydrazide, 0.02 mole of 4,4'-diamino-3-carbamoyldiphenyl ether, 0.1 mole of pyromellitic dianhydride and N,N'-dimethylacetamide were placed and reacted at 5° C. for 5 hours to give a polymer solution having a reduced viscosity ($\eta_{sp/c}$) of 0.3 dl/g at 30° C. and a solid content of 12% by weight. The polymer solution was diluted to a solid content of 8% by weight. Using the diluted polymer solution and an offset printing machine, orientation controlling films having thicknesses of 1000, 2000, and 3000 Å were produced in the same manner as described in Example 1 except for heating at 280° C. for 1 hour for removing the solvent and conducting ring closure. Liquid crystal display elements were produced and tested in the same manner as described in Example 1. Transparency was as shown in the attached drawing with numeral 7. The partially reflected pattern test, ◎.

EXAMPLE 8

In a flask, 0.05 mole of isophthalic acid dihydrazide, 0.05 mole of diaminosiloxane compound of the formula:

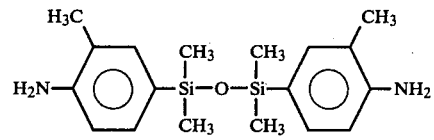

0.1 mole of pyromellitic dianhydride and N-methyl-2-pyrrolidone were placed and reacted at 5° C. for 3 hours to give a polymer solution having a reduced viscosity ($\eta_{sp/c}$) of 0.3 dl/g at 30° C. and a solid content of 14% by weight. The polymer solution was diluted to a solid content of 7% by weight. Using the diluted polymer solution and an offset printing machine, orientation controlling films having thicknesses of 1000, 2000 and 3000 Å were produced in the same manner as described in Example 1. Liquid crystal display elements were produced and tested in the same manner as described in Example 1. Transparency was as shown in the attached drawing with numeral 8. The partially reflected pattern test, ○.

Comparative Example 1

In a flask, 0.1 mole of 4,4'-diaminodiphenyl ether, 0.1 mole of pyrometllitic dianhydride and N,N-dimethylacetamide were placed and reacted at 10° and 15° C.

for 7 hours with stirring to give a polymer solution having a reduced viscosity ($\eta_{sp/c}$) of 0.6 dl/g at 30° C. and a solid content of 15% by weight. The polymer solution was diluted to 7% by weight. Using the diluted polymer solution and an offset printing machine, orientation controlling films having thicknesses of 1000, 2000 and 3000 Å were produced in the same manner as described in Example 1 except for heating at 280° C. for 1 hour for removing the solvent and conducting ring closure. Liquid crystal display elements were produced and tested in the same manner as described in Example 1. Transparency was as shown in the attached drawing with numeral 9. The partially reflected pattern test,

EXAMPLES 9 to 16

Using monomers and solvents as shown in Table 1, polyhydrazide acid-amide acids were synthesized in the same manner as described in Example 1. The resulting polymer solutions had solid contents and reduced viscosity at 30° C. as shown in Table 1. Orientation controlling films and liquid crystal display elements were produced and tested in the same manner as described in Example 1. Transparency expressed by the ratio of transmittance at 400 nm/transmittance at 600 nm at each total orientation controlling film thicknesses of 1000, 2000 and 3000 A was also listed in Table 1. The results of the partially reflected pattern test were also listed in Table 1.

As is clear from the above-mentioned results, the liquid crystal display elements having special orientation controlling films made from special polyhydrazimide-imide copolymers according to this invention are excellent in transparency and the partially reflected patterns thereof are hardly observable.

TABLE 1

| Example No. | Monomer Name | mole | Solvent | Polymer solution Solid content (%) | $\eta_{sp/c}$ (dl/g) | Transparency (%) Transmittance at 400 nm / Transmittance at 600 nm 1000 Å | 2000 Å | 3000 Å | Partially reflected pattern test |
|---|---|---|---|---|---|---|---|---|---|
| 9 | Terephthalic acid dihydrazide<br>4,4'-Diaminodiphenylmethane<br>1,2,5,6-naphthalenetetra-carboxylic dianhydride<br>4,4'-Oxy-bis(benzoic acid hydrazide) | 0.06<br>0.04<br>0.11<br>0.08 | N,N—Dimethyl-acetamide<br>Dimethyl sulfoxide | 15 | 0.3 | 94 | 93 | 91 | ◎ |
| 10 | 3.3'-Diaminophenyl sulfone<br>Pyromellitic dianhydride<br>4,4'-Sulfonyl-bis(benzoic acid hydrazide) | 0.02<br>0.1<br>0.05 | Sulfolane<br>N,N—Dimethyl-formamide | 20 | 0.5 | 97 | 96 | 94 | ◎ |
| 11 | 4,4'-Bis(p-aminophenoxy)-diphenyl sulfone<br>3,3',4,4'-Benzophenone-tetracarboxylic dianhydride<br>4,4'-Biphenyl-di(carbonyl hydrazide) | 0.05<br>0.1<br>0.07<br>0.07 | N—Methyl-2-pyrrolidone | 13 | 0.4 | 98 | 97 | 95 | ◎ |
| 12 | m-Phenylenediamine<br>3,3',4,4'-Diphenyltetra-carboxylic dianhydride<br>4,4'-Methylene-bis(benzoic acid hydrazide) | 0.03<br>0.1<br>0.06 | N—Methyl-2- | 15 | 0.4 | 95 | 93 | 92 | ◎ |
| 13 | 4,4'-Bis(p-aminophenoxy)-diphenyl propane<br>3,3',4,4'-Benzophenonetetra-carbocylic dianhydride<br>Adipic acid dihydrazide | 0.04<br>0.1<br>0.08 | Dimethyl sulfoxide | 18 | 0.6 | 96 | 94 | 92 | ◎ |
| 14 | $H_2N-(CH_2)_3-\underset{\underset{CH_3}{\mid}}{\overset{\overset{CH_3}{\mid}}{Si}}-O-\underset{\underset{CH_3}{\mid}}{\overset{\overset{CH_3}{\mid}}{Si}}-(CH_2)_3-NH_2$ | 0.02 | N,N—Dimethyl-acetamide | 20 | 0.3 | 97 | 96 | 94 | ○ |
| 15 | Pyromellitic dianhydride<br>Sebacic acid dihydrazide<br>4,4'-Diaminodiphenyl ether<br>3,3',4,4'-Benzophenonetetra-carboxylic dianhydride<br>Isophthalic acid dihydrazide | 0.1<br>0.05<br>0.05<br>0.1<br>0.07 | N—Methyl-2-pyrrolidone | 15 | 0.6 | 92 | 91 | 89 | ◎ |
| 16 | 4,4'-Diaminodiphenyl ether<br>Pyromellitic dianhydride | 0.03<br>0.1 | N—Methyl-2-pyrrolidone | 18 | 0.8 | 95 | 94 | 92 | ◎ |

What is claimed is:

1. In a liquid crystal display element comprising substrates having electrodes and liquid crystal orientation controlling films on the sides thereof facing a liquid crystal layer and one or more liquid crystal layers interposed between said substrates, the improvement wherein the liquid crystal orientation controlling film is made from a copolymer having structural units of the formulae:

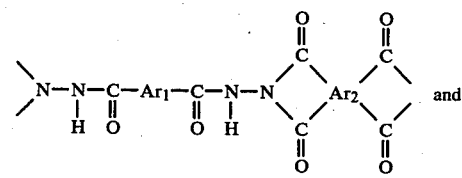 and

-continued

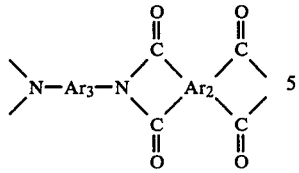

wherein Ar₁ is a dihydrazide residue; Ar₂ is a tetracarboxylic acid residue; and Ar₃ is a diamine residue.

2. A liquid crystal display element according to claim 1, wherein the dihydrazide residue Ar₁ is

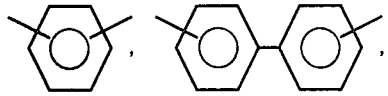

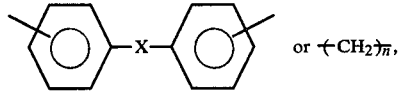 or $-(CH_2)_n-$, in which X is —O—, —CH₂—, —SO₂—, —CO— or —S—; and n is an integer of 1 to 8.

3. A liquid crystal display element according to claim 1, wherein the tetracarboxylic acid residue Ar₂ is

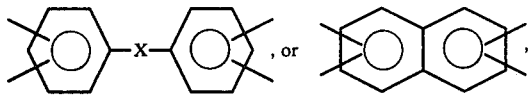

in which X is —O—, —SO₂—, —CO—, $$-\underset{\underset{CH_3}{|}}{\overset{\overset{CH_3}{|}}{C}}-,$$

or —CH₂—.

4. A liquid crystal display element according to claim 1, wherein the diamine residue Ar₃ is

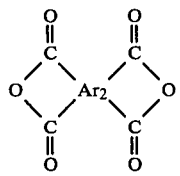

-continued in which X is —O—, —CH₂—, —SO₂—, —CO—, —S—, or $$-\underset{\underset{CH_3}{|}}{\overset{\overset{CH_3}{|}}{C}}-;$$

Y is an alkylene group, an alkyl group or a phenylene group; and Z is an alkyl group or an aryl group.

5. In a liquid crystal display element comprising substrates having electrodes and liquid crystal orientation controlling films on the sides thereof facing a liquid crystal layer and one or more liquid crystal layers interposed between said substrates, the improvement wherein the liquid crystal orientation controlling film is made from a copolymer produced by reacting a dihydrazide of the formula:

$$H_2N-\underset{H}{N}-\underset{O}{\overset{\|}{C}}-Ar_1-\underset{O}{\overset{\|}{C}}-\underset{H}{N}-NH_2$$

wherein Ar₁ is a dihydrazide residue, a diamine of the formula:

$$H_2N-Ar_3-NH_2$$

wherein Ar₃ is a diamine residue, and a tetracarboxylic acid dianhydride of the formula:

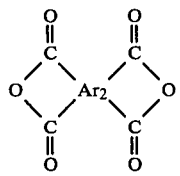

wherein Ar₂ is a tetracarboxylic acid residue, in a solvent at a temperature of 50° C. or less to form a polyhydrazide acid-amide acid having structural units of the formulae:

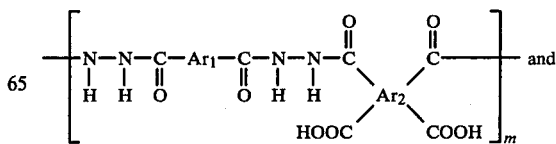

and

-continued

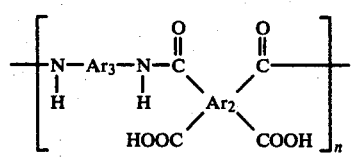

wherein Ar₁, Ar₂ and Ar₃ are as defined above; and values of m and n are those which can give a reduced viscosity ($\eta_{sp/c}$) of 0.1 dl/g or more measured by using dimethyl sulfoxide as a solvent in a concentration of 0.1 g/l at 30° C., said polyhydrazide acid-amide acid being subjected to ring closure with heating to give the co-polymer having structural units of the formulae:

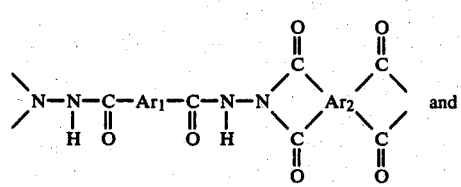 and

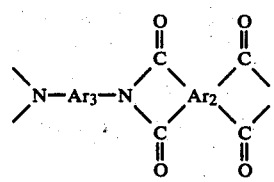

wherein Ar₁, Ar₂ and Ar₃ are as defined above.

6. A liquid crystal display element according to claim 5, wherein the dihydrazide residue Ar₁ is

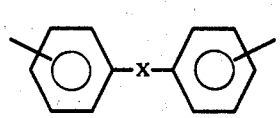

in which X is —O—, —CH₂—, —SO₂—, —CO— or —S—; and n is an integer of 1 to 8.

7. A liquid crystal display element according to claim 5, wherein the dihydrazide is at least one member selected from the group consisting of isophthalic acid dihydrazide, terephthalic acid dihydrazide, 4,4'-oxybis(-benzoic acid hydrazide), 4,4'-sulfonyl-bis-(benzoic acid hydrazide), 3,3'-sulfonyl-bis(benzoic acid hydrazide), 4,4'-methylene-bis(benzoic acid hydrazide), 4,4'-carbonyl-bis(benzoic acid hydrazide), 4,4'-biphenyl-di(carbonyl hydrazide), oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide and sebacic acid dihydrazide.

8. A liquid crystal display element according to claim 5, wherein the tetracarboxylic acid residue Ar₂ is

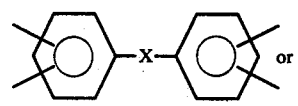

in which X is —O—, —SO₂—, —CO—,

or —CH₂—.

9. A liquid crystal display element according to claim 5, wherein the tetracarboxylic acid dianhydride is at least one member selected from the group consisting of pyromellitic dianhydride, 3,3',4,4'-biphenyltetracarboxylic dianhydride, 3,3',4,4'-benzophenonetetracarboxylic dianhydride, cyclopentanetetracarboxylic dianhydride, 1,2,5,6-naphthalenetetracarboxylic dianhydride, 2,3,6,7-naphthalenetetracarboxylic dianhydride, 1,4,5,8-naphthalenetetracarboxylic dianhydride, 3,4,9,10-perylenetetracarboxylic dianhydride, 2,3,5,6-pyridinetetracarboxylic dianhydride, 4,4'-sulfonyldi(phthalic anhydride), 4,4'-oxydi(phthalic anhydride), 4,4'-carbonyl-di(phthalic anhydride), and 4,4'-isopropylidene-di(phthalic anhydride).

10. A liquid crystal display element according to claim 5, wherein the diamine residue Ar₃ is

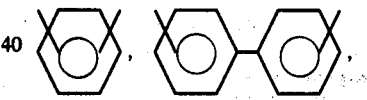

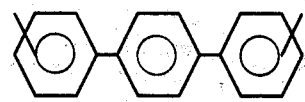

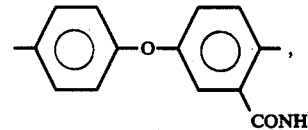

CONH₂

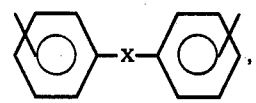

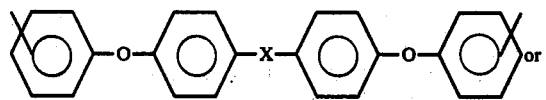

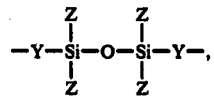

in which X is —O—, —CH₂—, —SO₂—, —CO—, —S— or

Y is an alkylene group, an alkyl group or a phenylene group; and Z is an alkyl group or an aryl group.

11. A liquid crystal display element according to claim 5, wherein the diamine is at least one member selected from the group consisting of m-phenylenediamine, p-phenylenediamine, 4,4'-diaminodiphenyl ether, benzidine, 4,4'-diaminoterphenyl, 4,4'-oxydianiline, 3,4'-oxydianiline, 4,4'-methylenedianiline, 4,4'-sulfonyldianiline, 3,3'-sulfonyldianiline, 3,3'-carbonyldianiline, 4,4'-thiodianiline, bis[4-(p-aminophenoxy)phenyl]ether, bis[4-(p-aminophenoxy)phenyl]methane, bis[4-(m-aminophenoxy)phenyl]sulfone, bis[4-(p-aminophenoxy)phenyl]sulfone, 4,4'-bis(p-aminophenoxy)benzophenone, bis[4-(p-aminophenoxy)phenyl]sulfide, bis[4-(p-aminophenoxy)phenyl]propane, 4,4'-diamino-3-carbamoyldiphenyl ether,

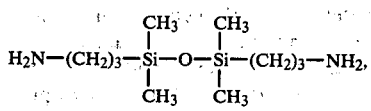

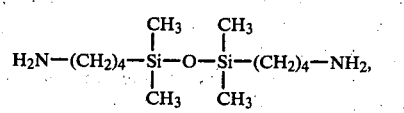

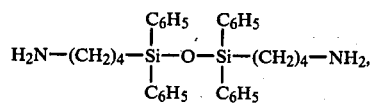

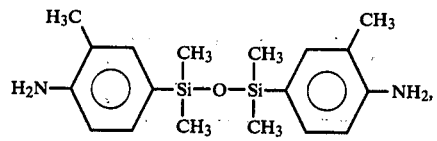

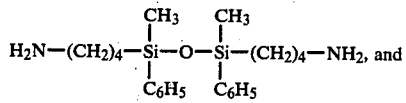

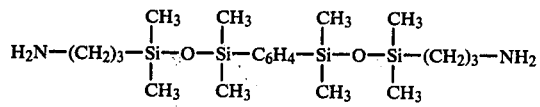

12. A liquid crystal display element according to claim 5, wherein the dihydrazide is at least one member selected from the group consisting of isophthalic acid dihydrazide, terephthalic acid dihydrazide, adipic acid dihydrazide, and sebacic acid dihydrazide; the diamine is at least one member selected from the group consisting of p-phenylenediamine, 4,4'-diaminodiphenyl sulfone, 4,4'-bis(m-aminophenoxy)-diphenyl sulfone, 4,4'-diamino-3-carbamoyldiphenyl ether,

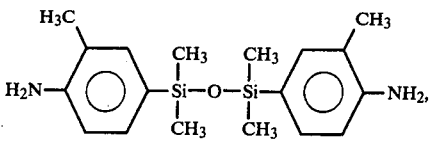

4,4'-diaminodiphenylmethane, 4,4'-bis(p-aminophenoxy)-diphenyl sulfone, m-phenylenediamine, 4,4'-bis(p-aminophenoxy)-diphenyl-propane,

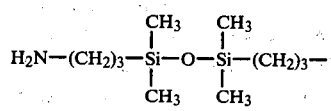

NH₂, and 4,4'-diaminidiphenyl ether; and the tetracarboxylic acid dianhydride is at least one member selected from the group consisting of pyromellitic dianhydride, 3,3',4,4'-benzophenonetetracarboxylic dianhydride, 1,2,5,6-naphthalenetetracarboxylic dianhydride, and 3,3',4,4'-diphenyltetracarboxylic dianhydride.

13. In a liquid crystal display element comprising substrates having electrodes and liquid crystal orientation controlling films on the sides thereof facing a liquid crystal layer and one or more liquid crystal layers interposed between said substrates, the improvement wherein the liquid crystal orientation controlling film is produced by using a varnish comprising (a) a polyhydrazide acid-amide acid having structural units of the formulae:

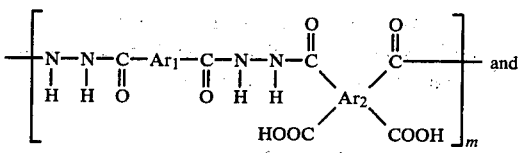

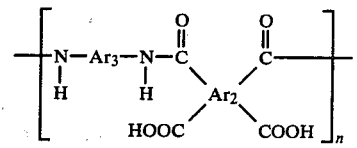

wherein Ar₁ is a dihydrazide residue; Ar₂ is a tetracarboxylic acid residue; Ar₃ is a diamine residue; and values of m and n are those which can give a reduced viscosity ($\eta_{sp/c}$) of 0.1 dl/g or more measured by using dimethyl sulfoxide as a solvent in a concentration of 0.1 g/l at 30° C., and (b) a solvent, and heating said varnish for removing the solvent and conducting ring closure.

14. A liquid crystal display element according to claim 13, wherein the solvent is at least one member selected from the group consisting of N-methyl-2-pyrrolidone, N,N-dimethylformamide, N,N-diethylformamide, N,N-dimethylacetamide, hexamethylphosphoramide, dimethyl sulfoxide and sulfolane.

15. A liquid crystal display element according to claim 13, wherein the dihydrazide residue Ar₁ is

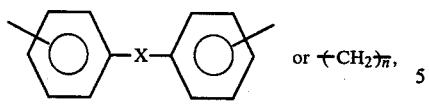 or $-(CH_2)_n-$, in which X is —O—, —CH$_2$—, —SO$_2$—, —CO— or —S—; and n is an integer of 1 to 8.

16. A liquid crystal display element according to claim 13, wherein the tetracarboxylic acid residue Ar$_2$ is

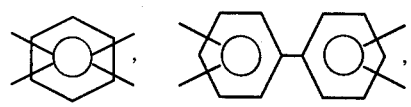

in which X is —O—, —SO$_2$—, —CO—,

or —CH$_2$—.

17. A liquid crystal display element according to claim 13, wherein the diamine residue Ar$_3$, is

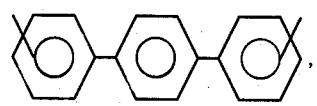

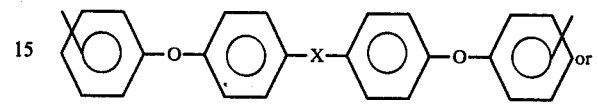

$$-Y-\underset{\underset{Z}{|}}{\overset{\overset{Z}{|}}{Si}}-O-\underset{\underset{Z}{|}}{\overset{\overset{Z}{|}}{Si}}-Y-,$$

in which X is —O—, —CH$_2$—, —SO$_2$—, —CO—, —S— or

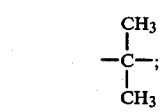

Y is an alkylene group, an alkyl group or a phenylene group; and Z is an alkyl group or an aryl group.

18. A liquid crystal display element according to claim 13, wherein the varnish further contains (c) one ore more silane coupling agents.

19. A liquid crystal display element according to claim 18, wherein the silane coupling agent is γ-aminopropyltriethoxysilane or γ-glycidoxypropyltrimethoxysilane.

20. A liquid crystal display element according to claim 1, 5 or 13, wherein the liquid crystal display element has a multi-layer structure.

21. A liquid crystal display element according to claim 1, 5 or 13, wherein a film of silane coupling agent is formed between the electrode and the liquid crystal orientation controlling film.

* * * * *